United States Patent [19]
Basuthakur et al.

[11] Patent Number: 5,411,227
[45] Date of Patent: May 2, 1995

[54] SATELLITE THRUSTER UNCERTAINTY ESTIMATION IN TRANSITION MODE

[75] Inventors: Sibnath Basuthakur, Rancho Palos Verdes; Bernard Soriano, Los Angeles, both of Calif.

[73] Assignee: Hughes Aircraft Company, Los Angeles, Calif.

[21] Appl. No.: 996,241

[22] Filed: Dec. 23, 1992

[51] Int. Cl.⁶ .............................................. B64G 1/26
[52] U.S. Cl. ...................................... 244/169; 364/459
[58] Field of Search ................ 244/164, 165, 169, 170, 244/171, 172; 364/459, 434

[56] References Cited

U.S. PATENT DOCUMENTS

| | | | |
|---|---|---|---|
| 3,944,172 | 3/1976 | Becker | 244/169 |
| 4,537,375 | 8/1985 | Chan | 244/169 |
| 4,958,788 | 4/1990 | Namera et al. | 244/169 |
| 4,961,551 | 10/1990 | Rosen | 244/169 |
| 5,098,041 | 3/1992 | Uetrecht | 244/169 |
| 5,124,925 | 6/1992 | Gamble et al. | 244/164 |

*Primary Examiner*—Galen L. Barefoot
*Attorney, Agent, or Firm*—Gordon R. Lindeen, III; William J. Streeter; Wanda K. Denson-Low

[57] ABSTRACT

The estimation and compensation of fixed, but unknown uncertainties of a thruster (22) for improving satellite attitude estimation and control as well as eliminating the need for nutation damping devices is disclosed. A thruster (22) is fired and an attitude state is estimated using an estimator (116). A commanded rate change (122) is calculated, which is modified using a compensating feedforward command (126) as updated by a fixed uncertainty estimator (124) unless an estimated rate is less than an absolute value of a threshold rate. The modified commanded rate change (130) is used to incrementally adjust thruster fire on-time (104) until a predetermined satellite trajectory is reached.

20 Claims, 7 Drawing Sheets

| CASE NO. | $\mu_0$ msec | $3\sigma$ msec | EXIT |
|---|---|---|---|
| 1 | 0 | 0 | YES |
| 2 | 0 | 2 | YES |
| 3 | 0 | 4 | YES |
| 4 | 4 | 0 | YES |
| 5 | 4 | 2 | YES |
| 6 | 4 | 4 | YES |
| 7 | 6 | 0 | YES |
| 8 | 6 | 2 | YES |
| 9 | 6 | 4 | YES |
| 10 | 8 | 0 | YES |
| 11 | 8 | 2 | YES |
| 12 | 8 | 4 | YES |

FIG. 10.

SATELLITE THRUSTER UNCERTAINTY ESTIMATION IN TRANSITION MODE

BACKGROUND OF THE INVENTION

The present invention relates to a method for estimating satellite thruster uncertainty.

For efficient propellant/fuel optimization, many satellites use bipropellant thrusters for all satellite maneuvering modes. For a precision pointing mission requirement, the knowledge of the minimum $I_{bit}$ pulse width of a thruster is essential to limit attitude control errors. For a zero bias momentum three-axis stabilized attitude control system with highly efficient bipropellant thrusters, precision pointing is often limited by the $I_{bit}$ uncertainty during all thruster modes.

The repeatability of bipropellant thrusters of a satellite with regard to the minimum $I_{bit}$ is not well characterized over an entire satellite mission life. This lack of knowledge of the thruster $I_{bit}$ is manifested in the inherent uncertainties in the thruster on-time with each thruster firing. Many factors contribute to these uncertainties and include thruster duty cycle time, inlet pressure, and inlet temperature. Because of the uncertainty of $I_{bit}$ over the life of the satellite mission, precision pointing with a bipropellant thruster is very difficult. This is particularly true in the transition from stationkeeping mode, which is used to place a craft in its orbital slot, and normal mode, which is the mode for approximately 95% of the life of a functional satellite.

Most satellites require nutation damping during such a transition, using either hardware or software. Typical hardware used for nutation damping includes gimballed momentum wheels, control moment gyroscopes, reaction wheels, or magnetic coils.

A technique for the stabilization of a satellite is disclosed in U.S. Pat. No. 4,537,375 to Chan. The Chan patent discloses the use of counteracting thrusters with thruster level mismatch and misalignments. The level mismatch and misalignments are eliminated by pre-bias of pulse width modulation of pulse-width/pulse-frequency modulation bursts of thrusters during maneuvering. Chan recognizes the difficulty in calibrating induced attitude error to burst because of controller compensation delays, and seeks a way to avoid such calibration using a multi-thruster approach. The Chan system fails to eliminate the need for nutation damping devices.

SUMMARY OF THE INVENTION

The present invention relates to a method which allows for the estimation and compensation of fixed, but unknown thrust uncertainties for improving satellite attitude estimation and control. The method of the present invention also embraces means for eliminating the need for nutation damping devices.

By estimating $I_{bit}$ uncertainty, the estimation of a satellite's state vector uncertainty is significantly improved. The state vector consists of roll position, yaw position, roll rate, and yaw rate. The control of this vector is improved because of the increased knowledge concerning it.

The method of the present invention estimates the fixed uncertainties in thruster firing by evaluating the resulting rates after each thruster firing to null, as in transitioning from stationkeeping to normal mode operations. A thruster of the satellite is fired. The attitude state of the satellite is then estimated and a commanded rate change calculated. The commanded rate change of thrusting is compensated by calculating a feedforward change which iteratively adjusts the commanded rate change. The compensation term adjusts for uncertainties associated with each thruster firing and approaches the fixed, but unknown bias as the number of firings from a thruster increases. Thruster fire on-time is incrementally adjusted using the compensated commanded rate change. As a result, over a period of time with additional firings from a thruster, the compensation term negates the unknown, fixed uncertainty and the resulting rate change is the desired rate. The invention is equally applicable to both linear and nonlinear (phase plane) control systems operating in geostationary or transfer orbit configurations.

When using the present invention with a phase plane control system, a thruster of the satellite is fired for a predetermined period of time when the satellite is at a switching curve of the phase plane. The position of the satellite is then monitored until an absolute value of the position is greater than a position deadband of the plane. Then the satellite thrusts to a boundary line of the phase plane. The satellite is then allowed to drift back to the switching curve.

Using the present invention, the transverse rate for a bias momentum system can be controlled to be below a desired arbitrary level. Since the transverse rate is directly related to the nutation angle, the induced nutation can be controlled to a very small value. This is accomplished by allowing optimal switching from stationkeeping to normal mode when the estimated nutation is small. The induced nutation is minimized before resuming normal mode operations. The invention also provides a method of precision pointing of the satellite during stationkeeping mode, when a set of gyros may not be operational or even completely unavailable.

For medium beam pointing (~0.15°) satellites with minimal payload articulation, i.e. minimum payload agility, this invention eliminates the need for fast nutation dampers. Future satellites with bias momentum and similar pointing requirements can make use of this invention to ensure adequate nutation while transitioning from stationkeeping to normal mode operation. This reduces the recurring/nonrecurring cost of the satellite ACS design due to a reduced attitude control system ("ACS") component requirement for this kind of mission. For high precision pointing missions where attitude pointing during stationkeeping is very important and is not relaxed from normal mode requirements, this invention is essential to control the beam pointing error.

Using the present invention, attitude control and distortion error may be reduced from 0.08 degrees to approximately 0.02 degrees.

BRIEF DESCRIPTION OF THE DRAWINGS

The various features, objects, benefits, and advantages of the present invention will become more apparent upon reading the following detailed description of the preferred embodiments, along with the appended claims in conjunction with the accompanying drawings, wherein identical reference numerals identify like features, and:

DETAILED DESCRIPTION OF A PREFERRED EMBODIMENT

Figure 1:
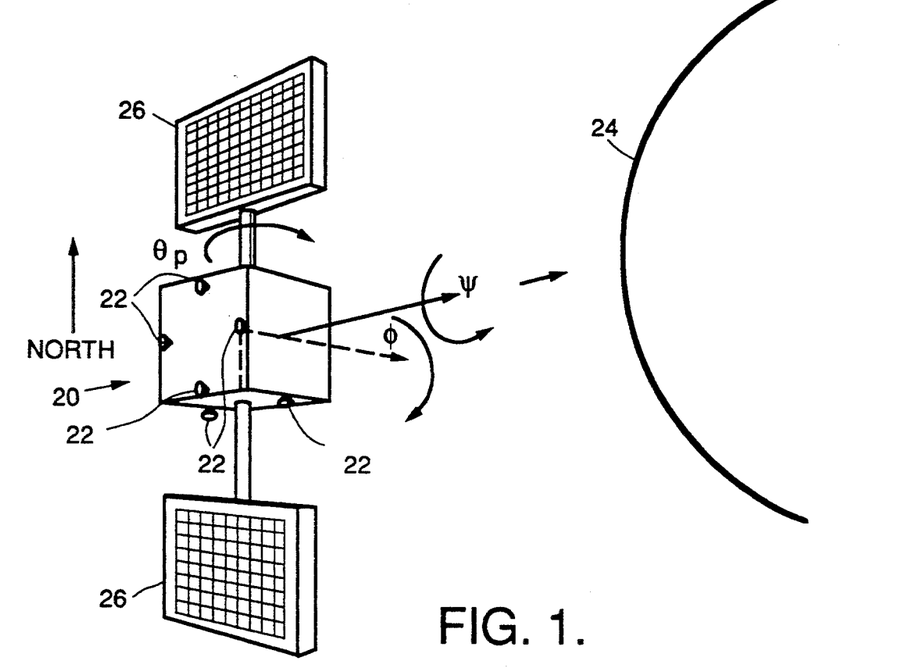
FIG. 1, is a perspective view of a satellite using the present invention.

Referring first to FIG. 1, the present invention broadly relates to a method of estimating thruster uncertainty in a satellite 20 having a plurality of thrusters, 22. Thrusters 22 are used to adjust satellite 20 in its orbit about a celestial body such as a planet 24. Satellite 20 has solar panels 26 disposed along a pitch axis, $\Theta_p$, aligned with the North-South axis of planet 24. A yaw axis, $\Psi$, is typically chosen to be in the direction of planet 24. Finally, a roll axis, $\phi$, is chosen to be along the tangent of the satellite's orbit. Most of the time, satellite 20 is in a normal mode whereby the satellite typically receives and sends signals. Satellite 20 will drift out of its orbital slot 28, however. As a result, at predetermined times, satellite 20 will enter a stationkeeping mode with thrusters 22 used to move the satellite back to its correct orbital slot 28. A transition then takes place in going from stationkeeping mode and the normal mode.

Figure 2:
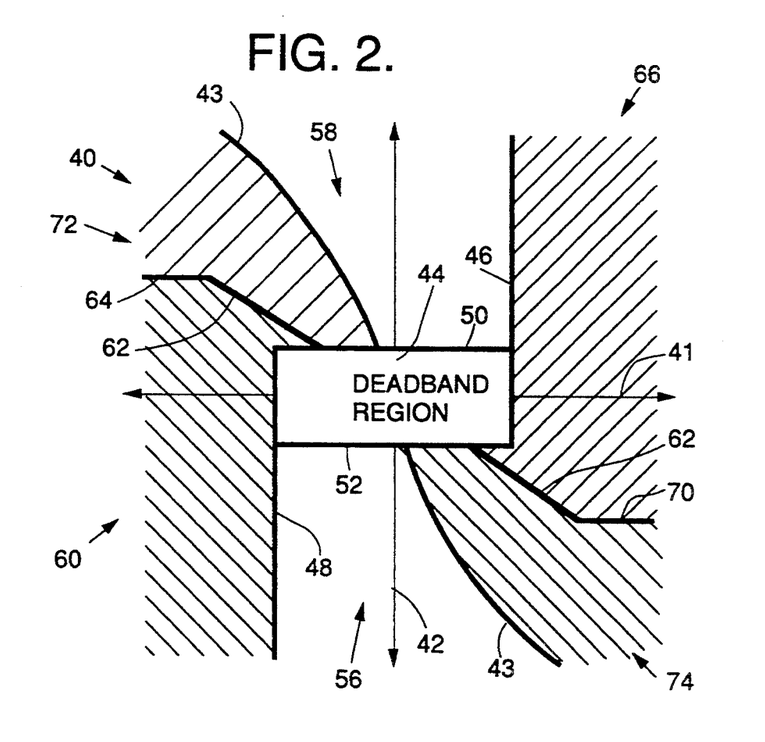
FIG. 2 is a diagram of a phase plane with defined regions representing the operational regime of the phase plane controller.

FIG. 2 shows a non-linear phase plane control regime 40 which represents the operation of a later-described phase plane controller 121. Axis 41 represents estimated position, $\hat{\Theta}$, and is the 0 rate line. Axis 42 represents the phase plane rate error, $\hat{\omega}$, in degrees per second. This is the difference between commanded rate and the estimate. It is divided into seven regions which are symmetric about a switching curve 43. Switching curve 43 is represented by the following equation:

$$\Theta^{SWC} = -0.8\ \text{sgn}(\omega)\ \omega^2\ K^{SWO}, \qquad (1)$$

wherein sgn($\omega$) represents $+/-$ 1 depending on the sign of $\omega$. In turn, switching operand constant, $K^{SWO}$, with units of sec$^2$/deg is represented by the following equation:

$$K^{SWO} = T_{samp}/(2\ \omega_{lim}), \qquad (2)$$

where SWO stands for the switching curve operand and $T_{samp}$ is the sampling time. The sampling time is different for different modes and is determined from the satellite design. $\omega_{lim}$ represents a rate command limit for roll and yaw of 0.01 degrees per second and a rate command limit for pitch of 0.02 degrees per second.

Region 44 is a deadband region for roll, yaw, and pitch, where no thrusting is done and there is no torque. It is bounded by lines 46 and 48, representing symmetrical position deadbands, $\Theta_{DB}$ and $-\Theta_{DB}$, respectively. $\Theta_{DB}$ has a roll, pitch, and yaw of 0.06 degrees. Region 44 is also bounded by lines 50 and 52, representing symmetrical rate deadbands, $\omega_{DB}$ and $-\omega_{DB}$, respectively. $\omega_{DB}$ has a roll and yaw of 0.009 degrees per second and a pitch of 0.005 degrees per second.

Region 56 is a positive torque region bounded by lines 43, 48, and 52 where the satellite thrusts up to the 0 rate line, 41. Region 58 is a negative torque region bounded by lines 43, 46, and 50 where the satellite thrusts down to the 0 rate line.

Region 60 is a positive torque region where the satellite thrusts up to a drift boundary line represented by line 62. It is bound by lines 48, 50, 62, and 64. Drift boundary line 62 is represented by the following equation:

$$\Theta^{DFT} = \hat{\omega}\ K^{NDS}, \qquad (3)$$

$K^{NDS}$ is a constant for negative drift slope whose value is determined by the design of the satellite. Line 64 represents the phase plane rate limit, $\omega^{PPLIM}$, which is 0.75 degrees per second.

Region 66 is a negative torque region where the satellite thrusts down to the drift boundary line represented by line 62. It is bound by lines 46, 52, 62, and 70. Line 70 represents the phase plane rate limit, $-\omega^{PPLIM}$, which is $-0.75$ degrees per second.

Region 72 is a drift region where the satellite drifts to the right in the phase plane without thrusting. It is bound by lines 43, 50, 62, and 64. Region 74 is also a drift region, but the satellite drifts to the left in the phase plane without thrusting. This region is bound by lines 43, 52, 62, and 70.

An appropriate rate change command, $\Delta\omega^c$, is computed when estimated attitude state (position and rate) errors lie in one of the above-described regions. Using the phase plane control regime 40, the objective is to maneuver the trajectory of satellite 20 to the null position and rate. This can only be accomplished by firing thrusters when the trajectory is on switching curve 43. Thus, the goal becomes getting the trajectory on switching curve 43 for a rate change command to null. The other regions on phase plane control 40 have commanded rates that take the trajectory to switching curve 43 in an optimal fashion.

In addition to the described regions, a subregion 76 has been defined within region 44. It is defined by the following transverse rate relationship:

$$\hat{\omega}_1^2 + \hat{\omega}_3^2 = \omega_{tr}^2 \qquad (4)$$

Figure 3:
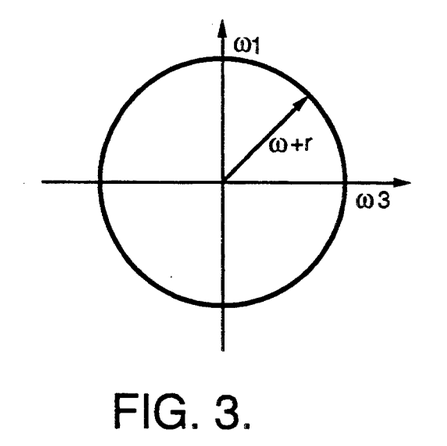
FIG. 3 is a phase space mapping of a subregion of the phase plane of FIG. 2.

$\omega_{tr}$, the maximum acceptable transverse rate, is equal to 0.0017 degrees per second or $\frac{1}{4} I_{bit}$ in this equation. $\hat{\omega}_1$ is the estimated roll rate and $\hat{\omega}_3$ is the estimated yaw rate. Subregion 76 maps into a phase space plot 78 as shown in FIG. 3 with a varying boundary region in the phase plane deadband region 44. This is done to make sure that roll and yaw rates are below a certain threshold in both axes. In contrast, the direction of pitch is more important than its magnitude.

There are several conditions which must be met before transition mode, between stationkeeping mode and normal mode, ends. The conditions for ending the transition mode are:

1) The pitch phase plane trajectory is within region 44;

2) The roll/yaw trajectories are within subregion 76; and

3) The above conditions are satisfied for 10 seconds.

By meeting these conditions, the satellite body rates developed in stationkeeping are reduced by an order of magnitude. In addition, the transverse rate at the resumption of normal mode is guaranteed to be $\leq 0.0017$ degrees per second.

If $\omega_{tr}$ does not fall within the threshold, there are two other means of ending transition mode. If the roll and yaw trajectories are within region 44 for a total of 420 seconds, then the satellite is switched from transition to normal mode. If either of the above conditions for ending transition mode are not satisfied, then transition mode ends after a duration of 30 minutes.

Figure 4:
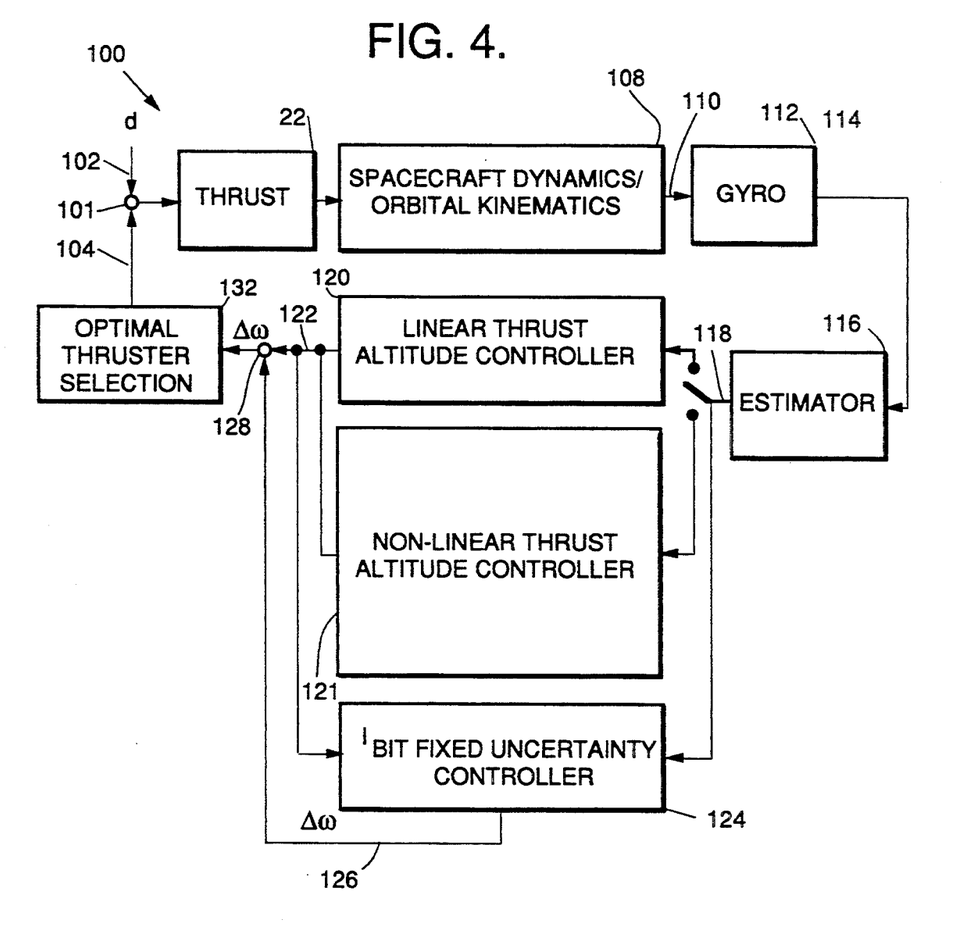
FIG. 4 is a block diagram illustrating features of the present invention.

To facilitate meeting the criteria for ending transition mode, the unknown but fixed uncertainty of $I_{bit}$, $\mu$, is estimated and compensated for. The basic methodology is to iteratively apply a correction term to the commanded rate change, $\Delta\omega^c$, to null. A block diagram 100 illustrating the use of a compensating feedforward command is illustrated in FIG. 4. At point 101 there are two inputs, 102 and 104. The first input is d, representing incoming disturbance. This disturbance includes the fixed uncertainty and noise. The second input is $t_{on}$, representing thruster on-time. As a result of inputs 102 and 104, a thruster 22 fires. The satellite dynamics and orbital kinematics are then determined at 108 according to the following well-known equations:

$$\dot{\phi} = \Omega\Psi + \omega_1, \quad (5)$$

$$\dot{\Psi} = -\Omega\phi + \omega_3, \quad (6)$$

$$\dot{\omega}_1 = -\omega_N\omega_3 + a_1{}^d + a_1{}^c, \quad (7)$$

$$\dot{\omega}_3 = \omega_N\omega_1 + a_3{}^d + a_3{}^c. \quad (8)$$

$\Omega$ is the orbit rate, $\phi$ is the roll measurement, and $\Psi$ is the yaw measurement. $\omega_1$ is the actual roll rate and $\omega_3$ is the actual yaw rate. $\omega_N$ is the nutation frequency. $a_1{}^d$ is the roll disturbance acceleration and $a_1{}^c$ is the roll control acceleration. Similarly, $a_3{}^d$ is the yaw disturbance acceleration and $a_3{}^c$ is the yaw control acceleration.

The output 110 is measured by gyroscope 112. The output of gyroscope 112, $\omega_g$, represented by line 114, goes to estimator 116. Estimator 116 is used to estimate the attitude state of the satellite. The output 118 of estimator 116 is used to derive a control signal to control to the estimated attitude state. Output 118 may switch between linear thruster attitude control 120 or non-linear thruster attitude controller 121 in order to calculate a commanded rate change, $\Delta\omega^c$. The regime of operation of the controller 121 is represented in FIG. 2 discussed above. Linear control 120 is represented by the following well-known equations:

$$\Delta\phi = \hat{\phi} - \hat{b}_1, \quad (9)$$

$$\Delta\Psi = \hat{\Psi} - \hat{b}_3, \quad (10)$$

$$a_1{}^c = -(K_r\omega_1 - C_r\hat{\omega}_3 + K_p\Delta\phi - C_p\Delta\Psi), \quad (11)$$

$$a_3{}^c = -(C_r\hat{\omega}_1 + K_r\hat{\omega}_3 + C_p\Delta\phi + K_p\Delta\Psi), \quad (12)$$

$\hat{\phi}$ is the estimated roll measurement and $\hat{\Psi}$ is the estimated yaw measurement. $a_1{}^c$ and $a_3{}^c$ are the same as defined above. $b_1$ is a roll bias term and $b_3$ is a yaw bias term. $K_r$, $C_r$, $K_p$, and $C_p$ are types of gains. In each situation, the commanded rate change, $\Delta\omega^c$, represented by output 122 from either linear thruster attitude controller 120, or non-linear thruster attitude controller 121, is calculated based on the results of the last thruster firing to null rate. More specifically, in the case of non-linear control, after a firing to null rate from switching curve 43, the trajectory is monitored. When the trajectory has reached the position edge 46 or 48 of deadband region 44, a compensating feedforward command, $\Delta\omega^{ff}$, is calculated using an $I_{bit}$ fixed uncertainty estimator, 124. Waiting for the trajectory to reach lines 46 or 48 accomplishes two things. First, it allows the flexible structural modes, which were excited by the thruster firings, to settle out. Secondly, it allows the estimator to converge to the actual rate and position. Thus, there is an accurate representation of the actual rate after thruster firings to null.

$\Delta\omega^{ff}$ is represented by output 126 from estimator 124. In the case of nonlinear control, the phase plane trajectories are measured in the roll, pitch, and yaw axes. For a particular axis, after each thruster firing to null rate, the resulting rate is evaluated. If the absolute value of the resulting rate is equal to or larger than the threshold rate, then on the subsequent firing to null rate, $\Delta\omega^{ff}$ is incremented or decremented by a rate equivalent to 1 msec of thruster on-time. If the resulting rate is within the threshold limit, then no incremental rate change is made to $\Delta\omega^{ff}$ on the next firing to null and the feedforward term maintains its current value. The comparison of estimated rate, $\hat{\omega}$ to threshold rate, $\omega_{check}$, is shown by the following equation:

$$|\hat{\omega}| \geq \omega_{check}, \quad (13)$$

where the value for $\omega_{check}$ is $(1/\sqrt{2})\omega_{tr}$. As noted above, if the estimated rate is less than the absolute value of $\omega_{check}$, then $\Delta\omega^{ff}$ is not recalculated.

The calculation of $\Delta\omega^{ff}$ is represented by the following equation:

$$\Delta\omega^{ff} = \Delta\omega^{ff} + \omega_{1ms}sgn(\hat{\omega}), \quad (14)$$

where $\omega_{1ms}$ is the rate equivalent to 1 msec of on-time. In the disclosed embodiment, this equals 0.0004 degrees per second on the yaw axis and 0.0008 degrees per second on the roll axis. The term is added only to the commanded rate from the same switching curve that was used to calculate $\Delta\omega^{ff}$. The feedforward term will approach the fixed but unknown uncertainty bias, $\mu$, for $I_{bit}$ as the number of thruster firings increase.

The commanded rate change, $\Delta\omega^C$, as represented by line 122, is modified using the compensating feedforward command at point 128 according to the following equation:

$$\Delta\omega^c = \Delta\omega^c - \Delta\omega^{ff}. \quad (15)$$

The modified commanded rate change 130 is used to determine the optimal thruster selection 132 to generate output 104, $t_{on}$.

Because different sets of thrusters are used to fire to null from either half of switching curve 43, the estimation of the uncertainty is computed for both thruster firings. Thus, for each of the axes two feedforward terms are calculated, one for a positive firing to null and one for a negative firing.

Figure 5:
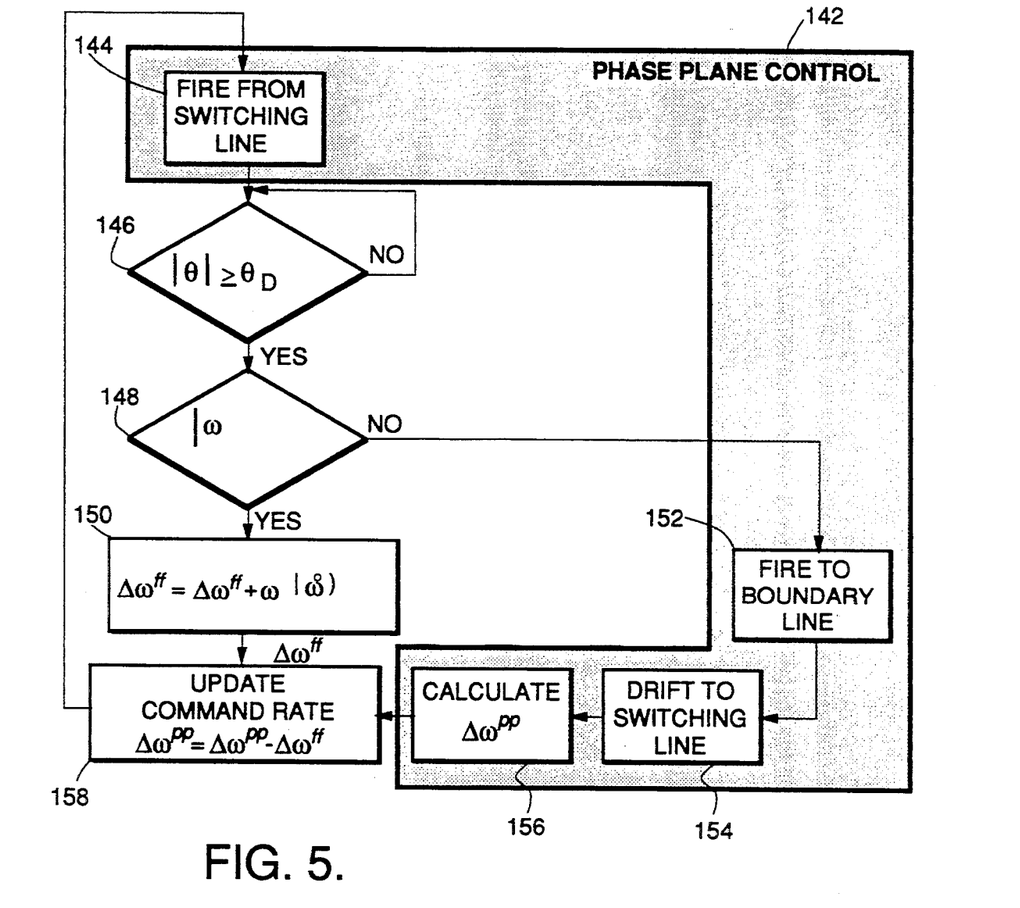
FIG. 5 is a flow diagram illustrating features of the present invention.

The approach used to estimate the fixed uncertainties associated with the thruster firings is summarized for the case of nonlinear control in flowchart 140 of FIG. 5. The phase plane control is represented as 143. At position 144, a thruster fires from switching line 43. At decision point 146, the absolute value of position, $\hat{\Theta}$, is monitored in order to determine if it is greater to or equal to the deadband position, $\Theta_{DB}$, as represented by lines 46 and 48. If it is not, then the monitoring is continued. Once a positive result is obtained, equation (13) is solved at decision point 148. If $|\hat{\omega}|$ is greater to or equal to $\omega_{check}$ then at point 150, equation (14) is solved for $\Delta\omega^{ff}$. Otherwise, the previously solved value of $\Delta\omega^{ff}$ is used. Then, at position 152 the satellite thrusts to boundary line 62. At position 154, the satellite drifts to switching curve 43. Then the command rate change, $\Delta\omega^c$, is calculated at position 156. This value is compensated using equation (15) at position 158, and acts as an input in determining the time of thruster firing from switching line 43.

Figure 6:
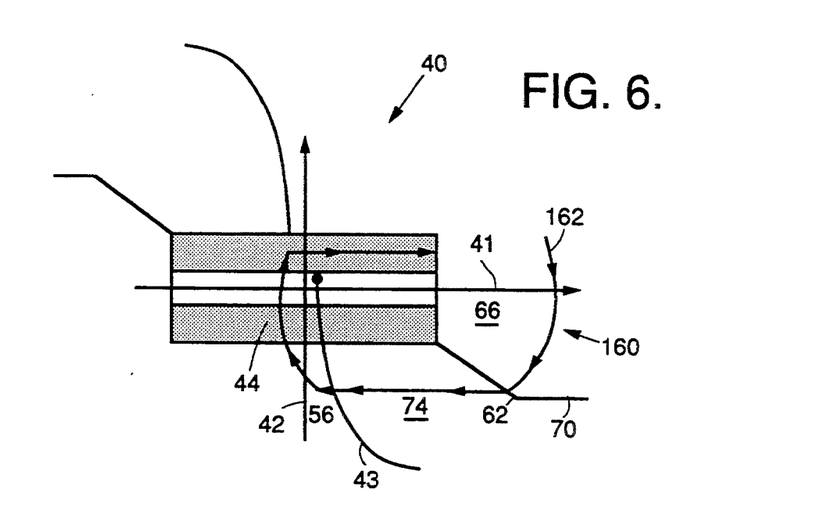
FIG. 6 illustrates the trajectory of a satellite within a phase plane using the present invention.
Figure 7A:
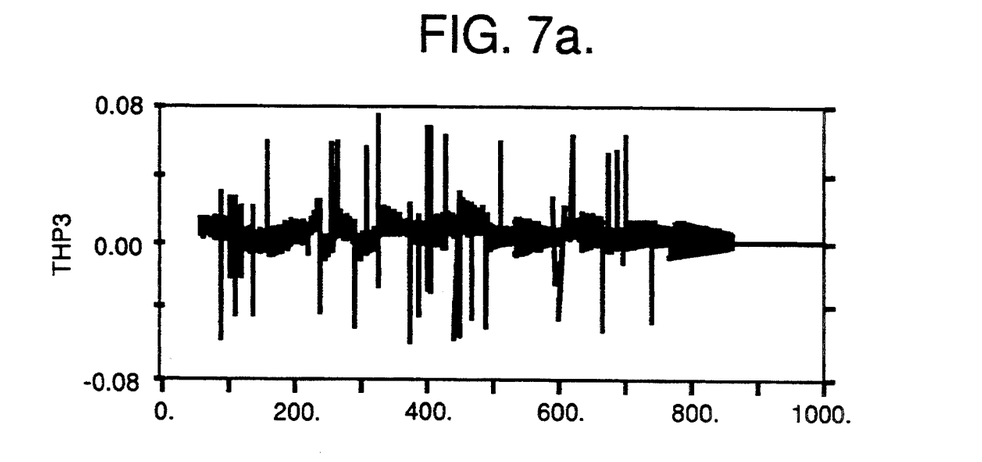
FIGS. 7(a)-7(f) shows a series of plots estimating fixed uncertainty using the present invention.
Figure 7B:
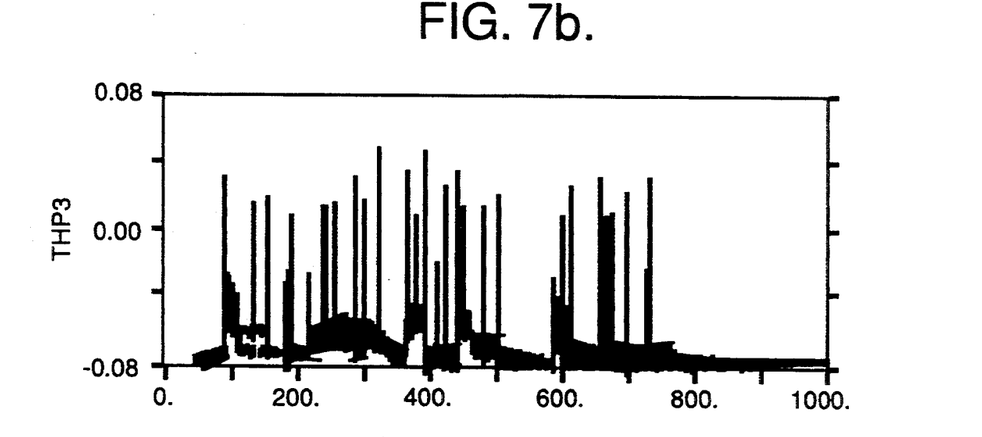
Figure 7C:
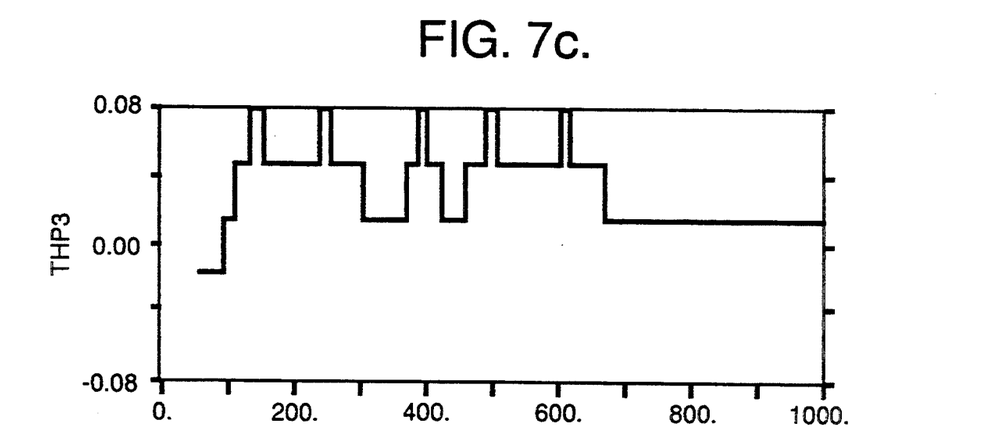
Figure 7D:
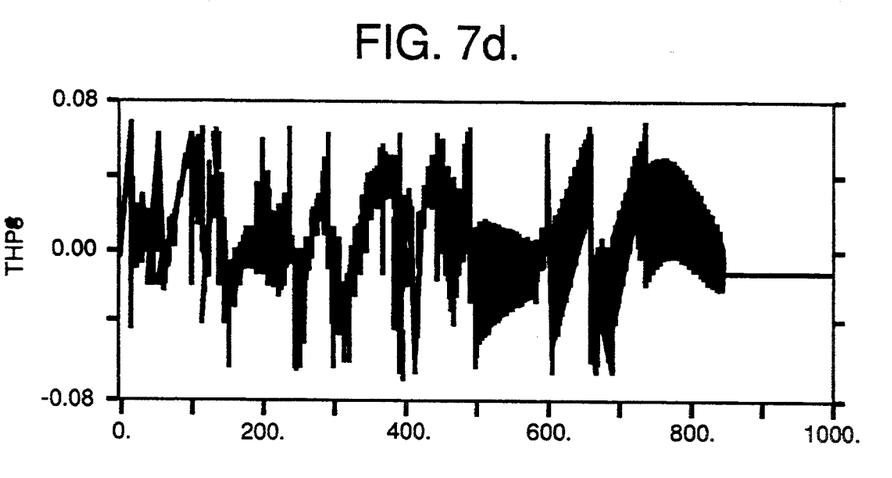
Figure 7E:
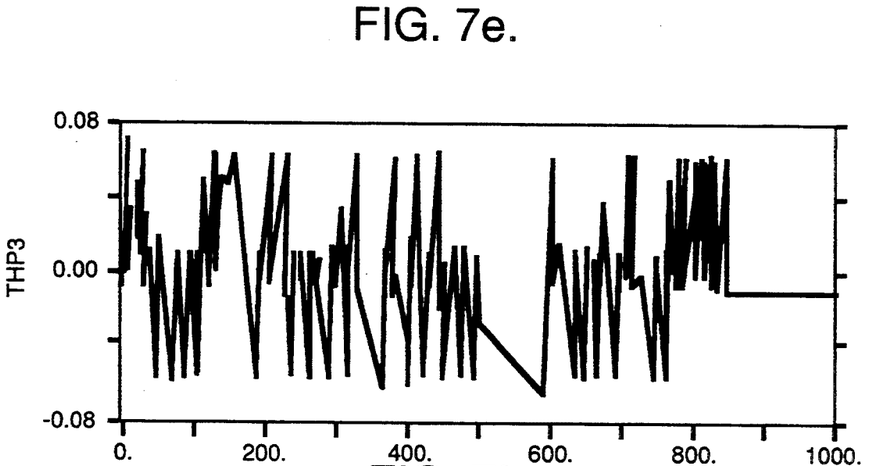
Figure 7F:
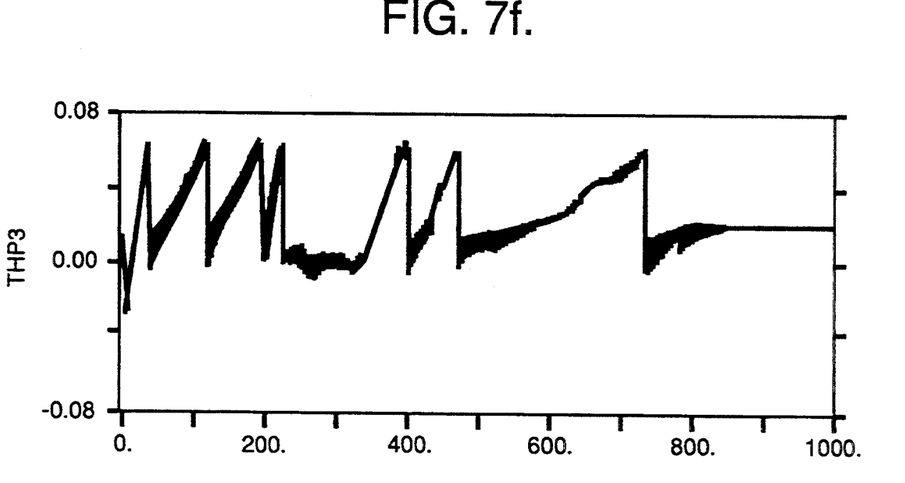

Using the present invention, the phase plane trajectory 160 starting at point 162 and ending at point 164 will resemble that illustrated in FIG. 6. With each subsequent firing, trajectory 160 is adjusted until it remains within threshold region 44 according to criteria explained above.

Using equation (14), $\Delta\omega^{ff}$ approaches $\omega_\mu$, the rate due to the fixed on-time uncertainty, $\mu$. More specifically, $\Delta\omega^{ff}$ should be in the neighborhood of $\omega_\mu$ in $\omega_\mu/\omega_{1ms}$ thruster firings to null from the same switching curve. This is because the command rate change, $\Delta\omega^c$, is adjusted on every firing to null by $\Delta\omega^{ff}$ until the result is a null rate. The plots shown in FIGS. 7(a)–7(f) illustrate this point. The resulting plots are due to a 10 second stationkeeping burn followed by the transition mode. A fixed bias was added to the thruster on-time with a uniform uncertainty distribution about the bias. When the exit criteria discussed above were satisfied, the transition mode ended. As shown, the feedforward term (delomglp for $\Delta\omega^{ff}$ due to a positive torque) for the roll axis approaches the fixed uncertainty, $\mu$, with each thruster firing to null. The other variables plotted are the estimated roll rate (wlgh), the transverse rate (wcomp), and the roll, pitch, and yaw attitudes (thp1, thp2s, thp3).

Figure 8:
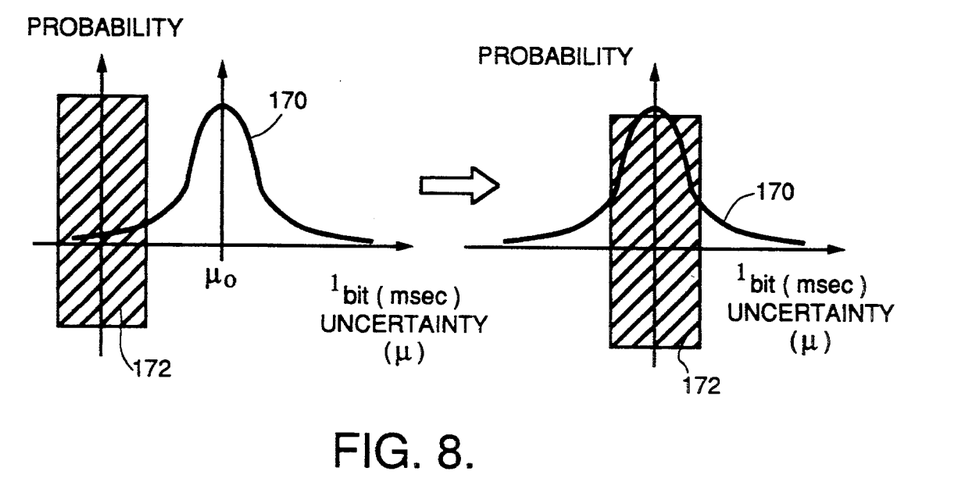
FIG. 8 illustrates the process of moving probability distribution to zero mean using the present invention.

By compensating for $\mu$, the probability distribution for the thruster on-time is effectively moved from a fixed bias offset to one with no bias, as shown in FIG. 8. A thruster uncertainty distribution function 170 is plotted using probability with respect to $I_{bit}$ uncertainty, $\mu$. Using the present invention, a fixed bias offset, $\mu_o$, is moved in conjunction with function 170 to a desired target region 172 where there is no such bias offset. The thruster uncertainty within target region 172 has a zero mean and a fixed variance. The task is then to find the probability of satisfying the exit criteria.

Once the probability distribution is effectively moved from a fixed offset bias to one with zero mean, the problem reduces to calculating the probability of satisfying the exit criteria given the thruster uncertainties. Because of the high-bandwidth of the control loop relative to nutation frequency, the roll and yaw rates can be considered independent, i.e., the coupling is minimized. If random variables x and y are normal and independent with zero mean and equal variance, then the random variable z has a Rayleigh density given by the following equation:

$$f(z) = \frac{z}{\sigma^2} e^{\frac{-z^2}{2\sigma^2}} U(z). \tag{16}$$

z is defined as $$\sqrt{x^2 + y^2},$$

$\sigma$ is the standard deviation and U(z) is the step function (U(z)=1 for $z \geq 0$, U(z)=0 for z<0). Using equation (16), the probability of the transverse rate, $\omega_{tr}$, being less than or equal to 0.0017 degrees for second can be calculated, for one thruster firing toward zero rate, by integrating from $-\infty$ to 0.0017.

The exit criteria also requires the pitch axis to be in region 44 of the pitch phase plane. Therefore, the total probability of success on each thruster firing to null rate is influenced by the probability of success in pitch and the time that pitch is inside region 44. The total probability of success on each thruster firing to null rate is given by the following equation:

$$P_{suc} = P_{suc}^{1,3} \times P_{suc}^2 \times (\% \text{ of time pitch axis is in region 44}), \tag{17}$$

where $P_{suc}^{1,3}$ is the probability of transverse rate being less than or equal to 0.0017 and $P_{suc}^2$ is the probability of the pitch axis being in deadband region 44.

The probability of success in N thruster firings to zero rate is given in the following equation as:

$$P_N = (1-(1-P_{suc})^N) \tag{18}$$

The combined transverse axis probability is given by the following equation:

$$P_{suc}^{1,3} = \int_{-\infty}^{0.0017} \frac{1}{\sigma^2} e^{\frac{-z^2}{2\sigma^2}} dz = 0.3787. \tag{19}$$

The pitch axis probability is given by the following equation:

$$P_{suc}^2 = \int_{-\infty}^{\omega_{DB}} \frac{z}{\sigma\sqrt{2\pi}} e^{\frac{-y^2}{2\sigma^2}} dy = 0.9963. \tag{20}$$

The values used for $\sigma$ are 0.0022 for equation (19) and 0.0055 for equation (20).

Equation (17) is then solved by assuming that the pitch axis is within the deadband for 90% of the time, which gives the following result:

$$P_{suc} = (0.3787)(0.9963)(0.90) = 0.3396. \tag{21}$$

Figure 9:
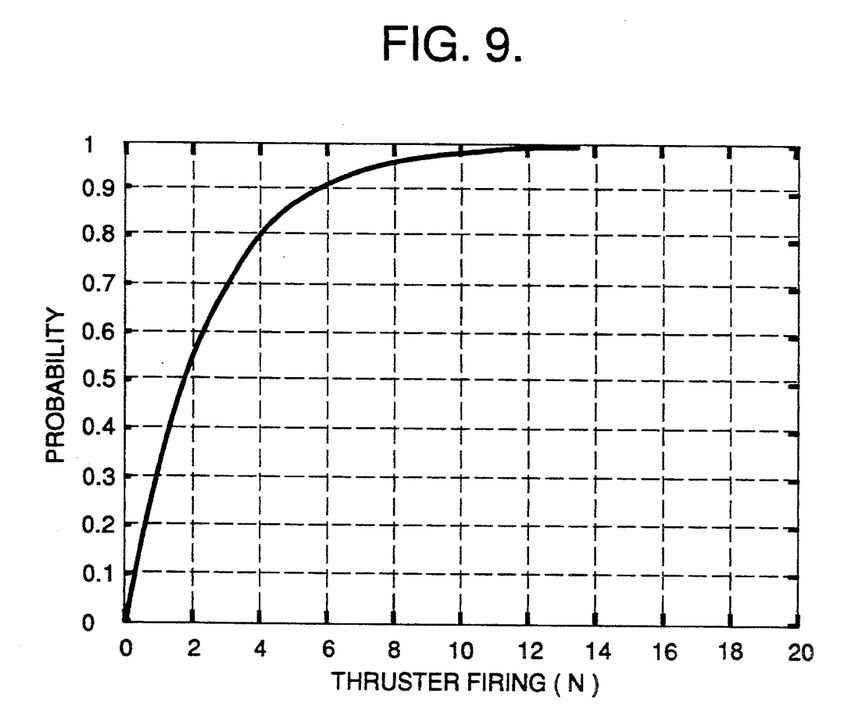
FIG. 9 is a plot showing the total probability of success versus the number of thruster firings.

Finally, equation (18) is solved as a function of N. The solution is plotted in FIG. 9 as a function of N thruster firings to null rate. $P_N$ equals 0.997 in 14 thruster firings toward zero rate. Thus, after 14 firings to null rate, the exit criteria is expected to be satisfied.

The underlying assumptions for this analysis are: (1) roll and yaw rates are statistically independent; and (2) the pitch axis is within deadband region 44 for 90% of the time.

Using a computer program, various simulation runs using the present invention were made with a 10 second East-West maneuver followed by a 420 second transition mode. A fixed uncertainty bias was added to $t_{on}$. In addition, the fixed bias was given a variable standard deviation, $3\sigma$, ranging from 0 msec to 4 msec.

Figure 10:
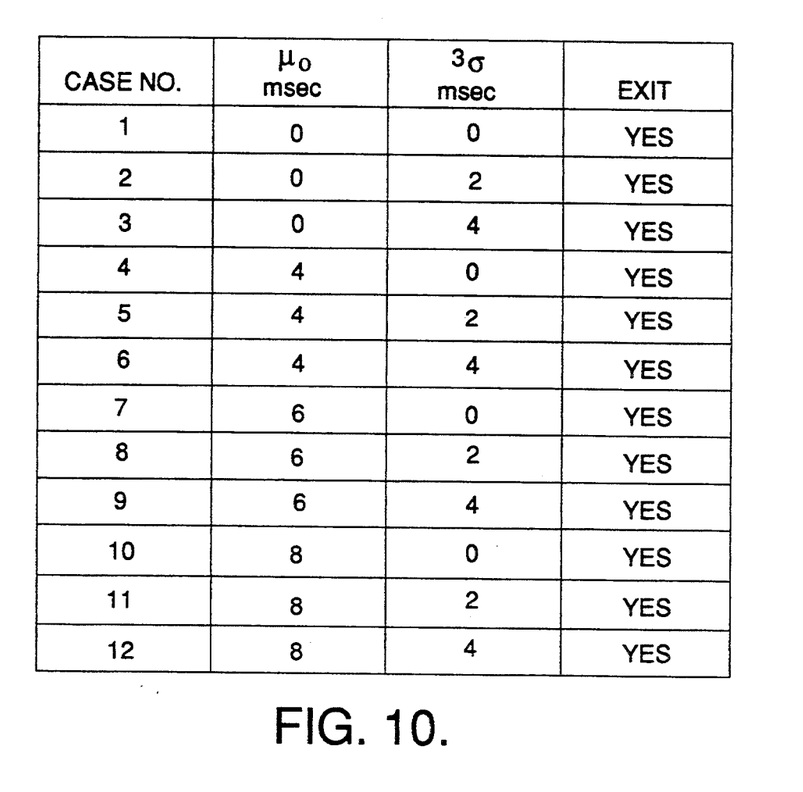
FIG. 10 is a table summarizing simulations using the present invention.

FIG. 10 summarizes the results of the simulation runs. For all combinations of the fixed biases and uncertainties, the invention was used to successfully reduce the transverse rate (or equivalently the nutation angle) to an acceptable level. $\omega_{tr}$ was reduced to a rate less than 0.0017 for normal mode operations. Thus, the nutation angle is guaranteed to be $\geq 0.10$ degrees at the resumption of normal mode.

While a preferred embodiment of the present invention has been described so as to enable one skilled in the art to practice the method of the present invention, it is to be understood that variations and modifications may be employed without departing from the purview and intent of the present invention, as defined in the following claims. Accordingly, the proceeding description is intended to be exemplary and should not be used to limit the scope of the invention. The scope of the invention should be determined only by reference to the following claims.

We claim:

1. For use with a satellite having thrusters, a method for estimating and compensating for fixed, but unknown thrust uncertainties for improving satellite attitude estimation and control, comprising the steps of:
   estimating an attitude rate of said satellite;
   calculating a commanded rate change for the attitude of said satellite, said commanded rate change specifying a specific on-time for a specific thruster of said satellite;
   calculating a compensating feedforward command for approximating the thrust uncertainties for said specified thruster;
   modifying said commanded rate change to compensate for said uncertainties using said compensating feedforward command;
   applying said modified commanded rate change for firing said specified thruster of said satellite for said specified on-time; and
   adjusting incrementally said thruster on-time using said modified rate change.

2. A method as recited in claim 1, including the step of firing said thruster using said incrementally adjusted thruster on-time until a predetermined satellite trajectory is reached.

3. A method as recited in claim 1, including the step of inputting said estimated attitude rate into a thruster attitude control algorithm to calculate said commanded rate change.

4. A method as recited in claim 2, including the step of updating a previously calculated feedforward command unless an estimated rate is less than an absolute value of a threshold rate.

5. A method as recited in claim 4, including the step of calculating said threshold rate using a maximum acceptable transverse rate.

6. A method as recited in claim 3, wherein step (B) is performed by using a nonlinear thruster attitude control phase plane.

7. A method as recited in claim 6, including the step of ending said firing of said thruster when a pitch phase plane trajectory is within a deadband region of said plane, and both a roll phase plane trajectory and a yaw phase plane trajectory are within a deadband subregion of said deadband region, said subregion being dependent upon a predetermined transverse rate.

8. A method as recited in claim 6, including the step of ending said firing of said thruster when a pitch phase plane trajectory, a roll phase plane trajectory, and a yaw phase plane trajectory are within a deadband region of said plane for a predetermined period of time.

9. For use with a satellite having thrusters, a method for estimating and compensating for fixed, but unknown thrust uncertainties in order to improve satellite attitude estimation and control involving the use of a nonlinear thruster attitude control phase plane, comprising the steps of:
   estimating an attitude rate of said satellite;
   monitoring an attitude of said satellite until an absolute value of said attitude is greater than an attitude deadband of said plane;
   thrusting to drive said satellite attitude to a boundary line of said plane resulting in drifting of said satellite attitude;
   allowing said satellite attitude to drift between said boundary line and said switching curve;
   calculating a commanded rate change for said attitude of said satellite, said commanded rate change specifying a specific on-time for a specific thruster of said satellite;
   calculating a compensating feedforward command for approximating the thrust uncertainties for said specified thruster;
   modifying said commanded rate change to compensate for said uncertainties using said compensating feedforward command;
   adjusting incrementally said thruster on-time using said modified rate change; and
   firing a thruster of said satellite by applying said modified commanded rate change for firing said specified thruster of said satellite for said specified on-time, when a trajectory of said satellite is at a switching curve of a nonlinear thruster attitude control phase plane.

10. A method as recited in claim 9, including the step of firing said thruster using said incrementally adjusted thruster fire on-time until predetermined conditions are met.

11. A method as recited in claim 10, wherein one of said predetermined conditions includes said phase plane trajectories being within a deadband region of said plane for a predetermined period of time.

12. A method as recited in claim 10, wherein one of said predetermined conditions includes a roll phase plane trajectory and a yaw phase plane trajectory being within a deadband subregion of said deadband region, said subregion being dependent upon a predetermined transverse rate.

13. A method as recited in claim 12, including the step of determining said transverse rate so as to limit induced nutation.

14. A method as recited in claim 13, including the step of setting said transverse rate to be no greater than 0.0017 degrees per second.

15. A method as recited in claim 9, including the step of updating a previously calculated feedforward command unless an estimated rate is less than an absolute value of a threshold rate.

16. A method as recited in claim 15, including the step of controlling induced nutation by calculating said threshold rate using a predetermined maximum allowable transverse rate.

17. A method as recited in claim 9, including the steps of measuring satellite dynamics and orbital kinematics using a gyroscope, and inputting said dynamics and mechanics into an estimator to estimate said attitude state.

18. For use with a satellite having thrusters, a method for moving a probability distribution for thruster on-time from a fixed bias offset to one with no bias, comprising the steps of:
(A) firing a thruster of a satellite;
(B) estimating an attitude state; and
(C) compensating for a fixed thruster on-time uncertainty by adjusting a compensating feedforward command using a rate equivalent to a fixed period of thruster on-time for each said firing of said thruster until said probability distribution is substantially within a desired target region wherein there is no said fixed bias offset.

19. A method as recited in claim 18, including the further step of ceasing the adjustment of said compensating feedforward command when an absolute value of an estimated rate is less than a threshold rate.

20. A method as recited in claim 19, including the step of controlling induced nutation by calculating said threshold rate using a predetermined maximum allowable transverse rate.

* * * * *